UNITED STATES PATENT OFFICE.

DAVID BAIRD MACDONALD, OF LEICESTER, AND JACKSON CALVERT, OF HUDDERSFIELD, ENGLAND; SAID CALVERT ASSIGNOR TO SAID MACDONALD.

MANUFACTURE OF NITROPHENOLS.

1,320,076.      Specification of Letters Patent.      Patented Oct. 28, 1919.

No Drawing.      Application filed November 21, 1917. Serial No. 203,182.

*To all whom it may concern:*

Be it known that we, DAVID BAIRD MACDONALD and JACKSON CALVERT, subjects of the King of Great Britain, residing at Leicester, England, and Huddersfield, England, respectively, have invented certain new and useful Improvements in or Relating to the Manufacture of Nitrophenols, of which the following is a specification.

This invention relates to the manufacture of nitro-phenols and has for its object an improvement in connection with the process wherein nitric acid, benzene and mercuric nitrate are used.

The invention consists in the use in the above mentioned process of carbon dioxid for the purpose of facilitating the formation of nitro-phenols, particularly 2:4-di-nitro-phenol.

The action of nitric acid on benzene in the presence of mercuric nitrate produces picric acid (tri-nitro-phenol), and nitro-benzene along with more or less mono-nitro-phenol.

According to this invention the action just described is carried out in the presence of carbon dioxid and it is found that when a sufficiency of this and nitric acid is used 2:4-di-nitro-phenol is formed in large quantities.

The carbon dioxid may be passed through the mixture or the treatment by the carbon dioxid may be carried out in any other suitable manner.

To enable the invention to be clearly understood, three examples of the manner in which it may be carried into practical effect will now be described.

According to one example, the process consists in dissolving 4 grams of mercury in 90 grams of nitric acid (sp. gr. 1.42) diluted with 7 grams of water; to this 40 grams of benzene are added. Into this mixture 22 grams of carbon dioxid gas at a pressure of approximately 1 atmosphere above normal is passed in a slow stream, the temperature being maintained at approximately 40° to 50° C. with or without extra agitation and the said quantity being passed into the mixture during a period of about 6 hours. After this period, or when the action ceases, the top layer, consisting of a solution of 2:4-di-nitro-phenol, some nitro-benzene and traces of ortho-mono-nitro-phenol in benzene, is drawn off and from this the 2:4-di-nitro-phenol may be separated by evaporating off the volatile products leaving the 2:4-di-nitro-phenol in a commercially pure condition. 2:4-di-nitro-phenol remaining in the acid liquor may be extracted with benzene which is then evaporated off.

Alternatively, when the action ceases, a jet of steam may be introduced into the mixture to separate by distillation, the benzene, nitro-benzene and any ortho-mono-nitro-phenol present, after which the 2:4-di-nitro-phenol may either be drained off, after cooling, or may be extracted with benzene and separated as aforesaid.

In another example, 4 grams of mercury may be dissolved in 20 grams of nitric acid (sp. gr. 1.39), to which is added 40 grams of benzene. A stream of carbon dioxid (22 grams in about 6 hours at a pressure of approximately 1 atmosphere above normal) is passed through a flask or vessel containing 70 grams of nitric acid (sp. gr. 1.42) the mixed vapors from the flask or vessel being led into the mixture of mercuric nitrate, nitric acid and benzene, the temperature being maintained at approximately 40° to 50° C. When the action ceases, separation may be effected in a similar manner to that described in the previous example. The mixed vapors from the flask or vessel may be either drawn or forced through or into the mixture of mercuric nitrate, nitric acid and benzene.

According to a further example, carbon dioxid gas may be first passed through benzene contained in a separate vessel, the mixed vapors being led into a mixture of nitric acid and mercuric nitrate the temperature being maintained at approximately 40° to 50° C. The ingredients may be used in proportions approximately similar to those given in the two examples previously described. The vapors may be either drawn or forced through or into the mixture the products being separated as previously set forth.

In carrying out the hereindescribed examples, provision may be made in a suitable manner for condensing and collecting the benzene, nitrogen oxids and nitric acid vapors (which are evolved in carrying out the process) for further use.

The invention is not to be confined to the proportions of the ingredients specified in the hereindescribed examples as such proportions may be varied without departing from the spirit of the invention as defined by the appended claims.

What we claim then is:—

1. In the manufacture of nitro-phenols by the process wherein nitric acid, benzene and mercuric nitrate are used, introducing carbon dioxid by drawing or forcing it through or into the mixture of mercuric nitrate, nitric acid and benzene.

2. In the manufacture of nitro-phenols by the process wherein nitric acid, benzene and mercuric nitrate are used, introducing carbon dioxid into the mixture of mercuric nitrate, nitric acid and benzene by first passing it through nitric acid and then drawing or forcing the mixed vapors into or through the said mixture.

In testimony whereof we affix our signatures in presence of two witnesses.

DAVID BAIRD MACDONALD.
JACKSON CALVERT.

Witnesses:
R. W. C. TAYLOR,
GEORGE LESTER.